(12) United States Patent
Li

(10) Patent No.: US 11,162,851 B2
(45) Date of Patent: Nov. 2, 2021

(54) PRESSURE SENSING STRUCTURE AND ELECTRONIC PRODUCT

(71) Applicant: SHENZHEN NEW DEGREE TECHNOLOGY CO., LTD., Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 82 days.

(21) Appl. No.: 16/479,405

(22) PCT Filed: Jul. 21, 2017

(86) PCT No.: PCT/CN2017/072000
§ 371 (c)(1),
(2) Date: Jul. 19, 2019

(87) PCT Pub. No.: WO2018/133054
PCT Pub. Date: Jul. 26, 2018

(65) Prior Publication Data
US 2019/0368952 A1    Dec. 5, 2019

(51) Int. Cl.
*G06F 3/01* (2006.01)
*G06F 3/041* (2006.01)
(Continued)

(52) U.S. Cl.
CPC ............ *G01L 1/2262* (2013.01); *G01L 1/127* (2013.01); *G01L 1/142* (2013.01); *G01L 1/2287* (2013.01);
(Continued)

(58) Field of Classification Search
CPC ... G01L 1/205; G01L 1/20; G01L 1/22; G01L 1/2262; G01L 1/14; G01L 1/142;
(Continued)

(56) References Cited

U.S. PATENT DOCUMENTS 3,576,128 A * 4/1971 Lockery ................ G01L 1/2243
73/862.622
3,915,015 A * 10/1975 Crane ..................... G01P 13/02
73/865.4
(Continued)

FOREIGN PATENT DOCUMENTS

CN    201281604    7/2009
CN    105094449    11/2015
(Continued)

OTHER PUBLICATIONS

International Search Report for PCT/CN2017/072000 dated Oct. 31, 2017, 6 pages—with English Translation.

*Primary Examiner* — Jonathan M Dunlap
(74) *Attorney, Agent, or Firm* — Nixon & Vanderhye, P.C.

(57) ABSTRACT

In a pressure sensing structure, a first elastic carrier is arranged on a first mounting surface of a substrate, an electronic component is arranged on the elastic carrier; when the substrate is deformed, the elastic carrier is bent and deformed with the deflection of the substrate; the substrate is configured to amplify a strain signal, deflection amount of the substrate may be detected by the strain sensing element, recognizable electric signal is output by a signal measuring circuit. The pressure sensing structure is a sensor structure with high precision, high reliability and high sensitivity. The pressure sensing structure is attached to a panel or a side frame of an electronic product, when the panel or the side frame is pressed, the deflection is detected by the strain sensing element and the recognizable electric signal is output by the signal measuring circuit. The electronic product may avoid the condition of being discontinuous in appearance, being difficult in waterproof and dustproof, (Continued)

being short in service life and being difficult in assembly due to traditional mechanical buttons from occurring.

20 Claims, 7 Drawing Sheets

(51) Int. Cl.
    *G01L 1/22*           (2006.01)
    *G06F 3/044*         (2006.01)
    *G01L 1/12*           (2006.01)
    *G01L 1/14*           (2006.01)
    *G06F 3/045*         (2006.01)
    *G01L 1/20*           (2006.01)

(52) U.S. Cl.
    CPC ............ *G06F 3/016* (2013.01); *G06F 3/0445* (2019.05); *G01L 1/12* (2013.01); *G01L 1/14* (2013.01); *G01L 1/146* (2013.01); *G01L 1/20* (2013.01); *G01L 1/205* (2013.01); *G01L 1/22* (2013.01); *G06F 3/044* (2013.01); *G06F 3/045* (2013.01); *G06F 3/0412* (2013.01); *G06F 3/04144* (2019.05)

(58) Field of Classification Search
    CPC . G01L 1/146; G01L 1/12; G01L 1/127; G06F 3/016; G06F 3/0412; G06F 3/04144; G06F 3/044; G06F 3/045
    See application file for complete search history.

(56) References Cited

U.S. PATENT DOCUMENTS

| | | | | |
|---|---|---|---|---|
| 4,266,263 A * | 5/1981 | Haberl | ................ | G08B 13/26 177/210 C |
| 4,429,756 A * | 2/1984 | Jacobson | ............... | G01G 19/44 177/211 |
| 5,154,247 A * | 10/1992 | Nishimura | ........... | G01G 3/1412 177/211 |
| 6,701,296 B1 * | 3/2004 | Kramer | ................ | A61B 5/6806 370/545 |
| 7,814,801 B2 * | 10/2010 | Inamori | .................... | G01B 7/20 73/849 |
| 10,197,459 B2 * | 2/2019 | Keller | ..................... | G01L 1/146 |
| 10,203,254 B2 * | 2/2019 | Bechstein | ............. | G01L 1/2281 |
| 2007/0211336 A1 * | 9/2007 | Michihata | .............. | G02B 5/305 359/487.05 |
| 2008/0202251 A1 * | 8/2008 | Serban | ................. | H03K 17/962 73/780 |
| 2010/0036287 A1 * | 2/2010 | Weber | ..................... | G01L 1/242 600/595 |
| 2010/0090299 A1 * | 4/2010 | Chang | ..................... | G01L 1/205 257/419 |
| 2011/0023630 A1 * | 2/2011 | Zandman | ............. | G01B 21/045 73/862.623 |
| 2012/0006124 A1 * | 1/2012 | Mathias | ................. | A63F 13/21 73/788 |
| 2013/0133435 A1 * | 5/2013 | Muramatsu | ............... | G01D 5/16 73/799 |
| 2016/0103545 A1 * | 4/2016 | Filiz | ....................... | G01L 1/005 345/174 |
| 2016/0328065 A1 * | 11/2016 | Johnson | ................. | G06F 3/0488 |
| 2016/0369115 A1 * | 12/2016 | Shimoju | .................. | C09J 11/06 |
| 2016/0370523 A1 * | 12/2016 | Shimoju | ................... | G02B 1/14 |
| 2017/0060189 A1 * | 3/2017 | Sohn | ..................... | G06F 1/1652 |
| 2017/0060283 A1 * | 3/2017 | Sohn | ....................... | G06F 3/041 |
| 2017/0194384 A1 * | 7/2017 | Zhou | .................... | H01L 27/323 |
| 2018/0172527 A1 * | 6/2018 | Kim | ...................... | G01L 1/2287 |
| 2018/0188874 A1 * | 7/2018 | Cho | ........................ | G01L 1/205 |
| 2019/0094007 A1 * | 3/2019 | Li | ............................. | G01L 9/02 |

FOREIGN PATENT DOCUMENTS

| | | |
|---|---|---|
| CN | 204740575 | 11/2015 |
| CN | 105224129 | 1/2016 |
| CN | 105278792 | 1/2016 |
| CN | 105675183 | 6/2016 |
| CN | 106066737 | 11/2016 |

\* cited by examiner

PRESSURE SENSING STRUCTURE AND ELECTRONIC PRODUCT

This application is the U.S. national phase of International Application No. PCT/CN2017/072000 filed Jan. 21, 2017 which designated the U.S., the entire content of which is hereby incorporated by reference.

TECHNICAL FIELD

The present disclosure relates to the field of pressure sensing structure, and more particularly to a pressure sensing structure and an electronic product.

BACKGROUND

At present, with the widely use of capacitive screens, electronic products, and especially the various components of a smart phone begin to use a touch type structure to replace an original mechanical structure such as a keyboard and a home button of a mobile phone, etc., and become electronic and intelligent gradually. However, the traditional mechanical buttons are still used as side buttons of most smart phones due to technologies and reasons in other aspects. The existence of the traditional mechanical buttons brings shortcomings of being discontinuous in appearance, being difficult in waterproof and dustproof, being short in service life and being difficult in assembly.

Technical Problem

An objective of the present disclosure is to provide a pressure sensing structure, which aims at solving a technical problem that the existing touch type structure is discontinuous in appearance, has difficulty in waterproof and dustproof, and is difficult to be assembled.

Technical Solution

The present disclosure is implemented in this way, a pressure sensing structure, including:

a substrate having a first mounting surface and a second mounting surface which are opposite to each other;

a first elastic carrier arranged on the first mounting surface; and a signal measuring circuit having at least one electronic component, where the at least one electronic component is located on the first elastic carrier, and the at least one electronic component is a strain sensing element configured to detect deflection amount of the substrate.

Another objective of the present disclosure is to provide an electronic product, including a panel and a pressure sensing structure mentioned above, where the pressure sensing structure is attached to an inner side of the panel.

Another objective of the present disclosure is to provide an electronic product, including a side frame and a pressure sensing structure mentioned above, where the pressure sensing structure is attached to an inner side of the side frame.

Advantageous Effects of the Present Disclosure

Compared with the prior art, the pressure sensing structure in the present disclosure has the following technical effects: in the pressure sensing structure, the first mounting surface of the substrate is provided with the first elastic carrier, an electronic component is arranged on the first elastic carrier, when the substrate is deformed, the first elastic carrier is bent and deformed with the deflection of the substrate, the substrate is configured to amplify strain signal, where the strain sensing element may detect the deflection of the substrate, and the recognizable electric signal is output by the signal measuring circuit. The pressure sensing structure is a sensor structure with high precision, high reliability and high sensitivity.

As compared to the traditional capacitive buttons, the pressure sensing structure may be applied to a pressure button of any electronic product made of plastic or metal, and may detect a pressing intensity simultaneously by detecting the strain. As compared to the pressure capacitance, the strain gauge or the strain film in the prior art, the pressure sensing structure is more sensitive, is convenient in use, and may be applied to the electronic product with higher structural strength, and therefore mass production of the pressure sensing structure may be realized.

The pressure sensing structure is attached to the inner side of the panel of the electronic product, when the panel is pressed, the panel may generate a deflection, which causes the substrate to generate deflection, the deflection is detected by the strain sensing element, and recognizable electric signal is output by the signal measuring circuit. The detection of applied pressure and pressed position may be realized by detecting the strain of the panel.

The pressure sensing structure is attached to the side frame of the electronic product, and particularly to the side frame of the intelligent mobile phone, when the side frame is pressed, the substrate may be bent and deformed with the pressing of the side frame, the deflection is detected by the strain sensing element, and the recognizable electric signal is output by the signal measuring circuit, both the pressed position and the pressing force are recognized, and a lateral touch button function is realized, there is no need to concavely arrange a groove on the side frame of the electronic product independently, so that the appearance is simple and elegant.

Both of the two kinds of electronic products may avoid the conditions of discontinuous appearance, the difficulty in waterproof and dustproof, short service life and the difficulty in assembly due to the traditional mechanical buttons from occurring.

DESCRIPTION OF THIS EMBODIMENTS

In order to make the objective, the technical solution and the advantages of the present disclosure be clearer and more understandable, the present disclosure is further described in detail below with reference to accompanying figures and embodiments hereinafter. It should be understood that the specific embodiments described herein are merely intended to illustrate but not to limit the present disclosure.

Figure 1:
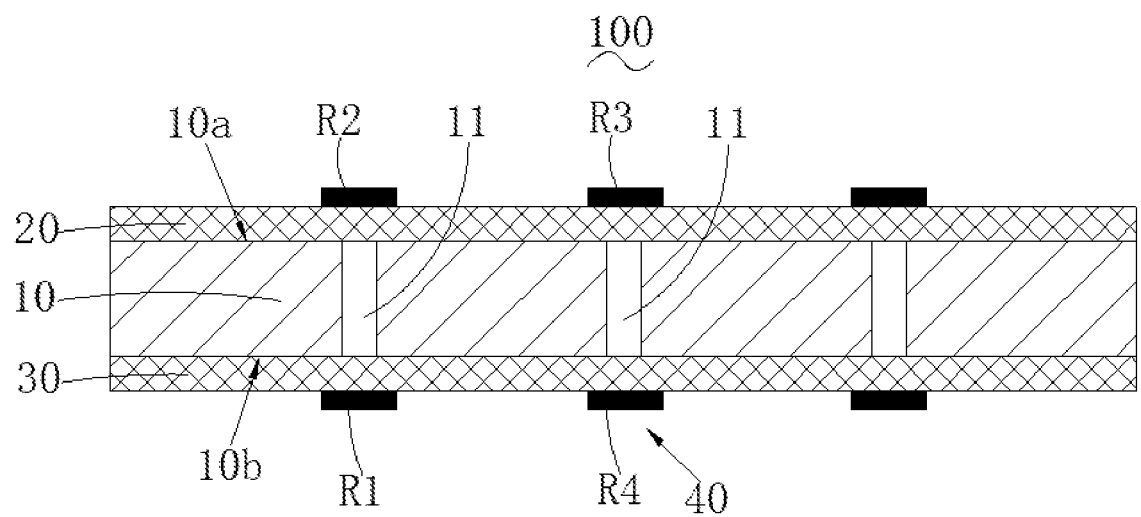
FIG. 1 depicts a schematic structural diagram of a pressure sensing structure provided by embodiment one of the present disclosure.

Referring to FIG. 1, a pressure sensing structure 100 provided by embodiment one of the present disclosure includes: a substrate 10, where the substrate 10 is provided with a first mounting surface 10a and a second mounting surface 10b which are opposite to each other; a first elastic carrier 20 arranged on the first mounting surface 10a; and a signal measuring circuit 40 having at least one electronic component, where the at least one electronic component is located on the first elastic carrier 20, and the at least one electronic component is a strain sensing element configured to detect deflection of the substrate 10.

In the pressure sensing structure 100, the first elastic carrier 20 is arranged on the first mounting surface 10a of the substrate 10, an electronic component is arranged on the first elastic carrier 20, when the substrate 10 is deformed, the first elastic carrier 20 is bent and deformed with the deflection of the substrate 10, the substrate 10 is configured to amplify strain signal, where the deflection of the substrate 10 may be detected by the strain sensing element, and recognizable electric signal is output by the signal measuring circuit 40. The pressure sensing structure 100 is a sensor structure with high precision, high reliability and high sensitivity.

As compared to the traditional capacitive buttons, the pressure sensing structure 100 may be applied to a press button of any electronic product made of plastic or metal, and may detect a pressing intensity simultaneously by detecting strain. As compared to a pressure capacitance, a strain gauge or a strain film in the prior art, the pressure sensing structure 100 is more sensitive, is convenient in use, and may be applied to an electronic product with higher structural strength, and therefore mass production of the pressure sensing structure 100 may be realized.

Figure 6:
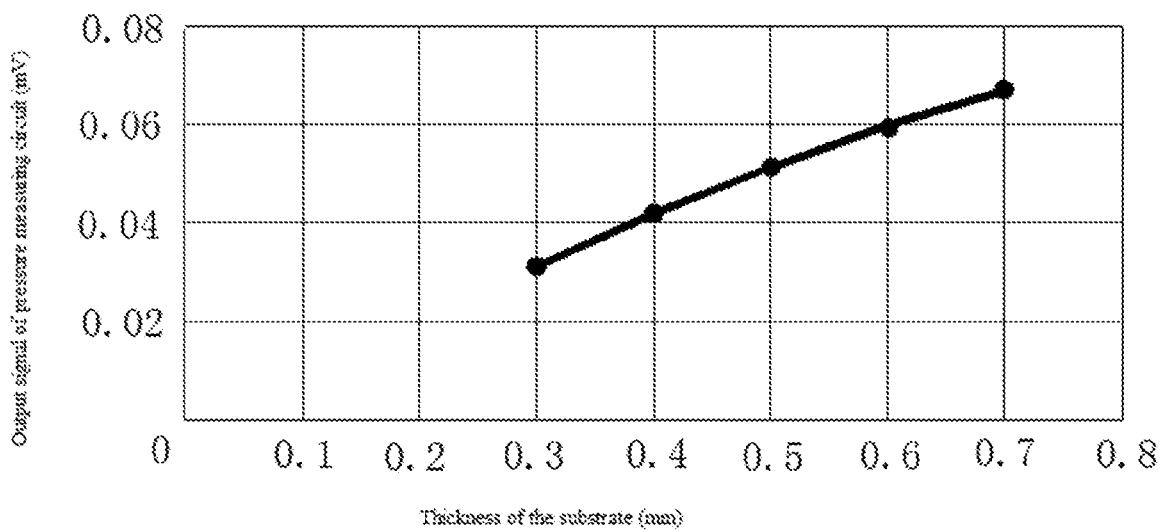
FIG. 6 depicts a diagram reflecting a relationship between a thickness of the substrate and output signal of a signal measuring circuit, which is obtained by finite element simulation.

The substrate 10 may be made of a material having elastic deformation characteristics. The substrate 10 may increase the thickness of the integral structure when the pressure sensing structure 100 is attached to an inner side of a panel or an inner side of a side frame or an inner side of other thin-walled part, the strain of the strain sensing element is greater under the deformation of identical curvature radius of the thin-walled part, and the corresponding change value $\Delta R$ is greater, so that more intensive electric signal may be obtained, and the pressure sensing structure 100 is more sensitive in reaction to the strain. Theoretically, output signal of the signal measuring circuit 40 is directly proportional to the thickness of the substrate 10, that is, the thicker the substrate 10, the more sensitive the pressure sensing structure 100. As shown in FIG. 6, when simulating output signals of the signal measuring circuit 40 on the substrate 10 with different thicknesses through finite element simulation, the relationship between the output signal of the signal measuring circuit 40 and the thickness of the substrate 10 is found to be consistent with a theoretical result.

Further, the second mounting surface 10b is provided with a second elastic carrier 30, there are at least two electronic components in each signal measuring circuit 40, where at least one electronic component is located on the first elastic carrier 20, the other electronic components are located on the second elastic carrier 30, the electronic components in the signal measuring circuit 40 are distributed adjacently. The two mounting surfaces of the substrate 10 are respectively provided with the first elastic carrier 20 and the second elastic carrier 30, both the first elastic carrier 20 and the second elastic carrier 30 are provided with electronic components, when the substrate 10 is deformed, the first elastic carrier 20 and the second elastic carrier 30 are bent and deformed with the deflection of the substrate 10, strain signal is amplified by the substrate 10, where the deflection of the substrate 10 may be detected by the strain sensing element, and the recognizable electrical signal is output by the signal measuring circuit 40.

The first elastic carrier 20 and the second elastic carrier 30 have an elastic deformation characteristics and are configured to install electronic components. When the strain sensing element is arranged on the first elastic carrier 20 and the second elastic carrier 30 respectively, the strain sensing element is configured to detect strain variation between the first elastic carrier 20 and the second elastic carrier 30, and the recognizable electrical signal is output through circuit processing.

Figure 7:
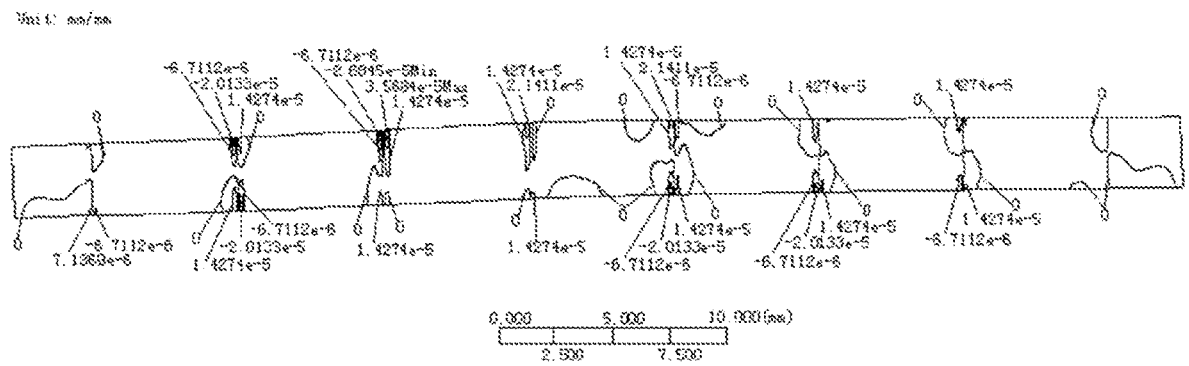
FIG. 7 depicts a simulation diagram of strains of a first elastic carrier, which is obtained by finite element simulation.

Furthermore, a strain concentration groove 11 is concavely arranged on the substrate 10, and the electronic component is arranged to be adjacent to the strain concentration groove 11. This design is prone to be processed, and the strain sensing element is arranged to be adjacent to the strain concentration groove 11, such that the strain may be more concentrated on the part of the elastic carrier adjacent to the strain concentration groove 11, and the strain sensing element may be allowed to detect the strain in the region of the strain concentration groove 11 to obtain larger strain signal, and the pressure sensing structure 100 is caused to be more sensitive. Referring to the constraint condition of the pressure sensing structure 100, eight strain concentration grooves are concavely arranged on the substrate 10, a finite element simulation analysis is performed on the first elastic carrier 20; as shown in FIG. 7, the strain of the first elastic carrier 20 is concentrated at the location of the strain concentrated groove 11 of the substrate 10, the strain sensing element may detect very large strain signal, such that the pressure sensing structure 100 has high precision, high reliability and high sensitivity. The condition of the second elastic carrier 30 is similar to that of the first elastic carrier 20.

Figure 2:
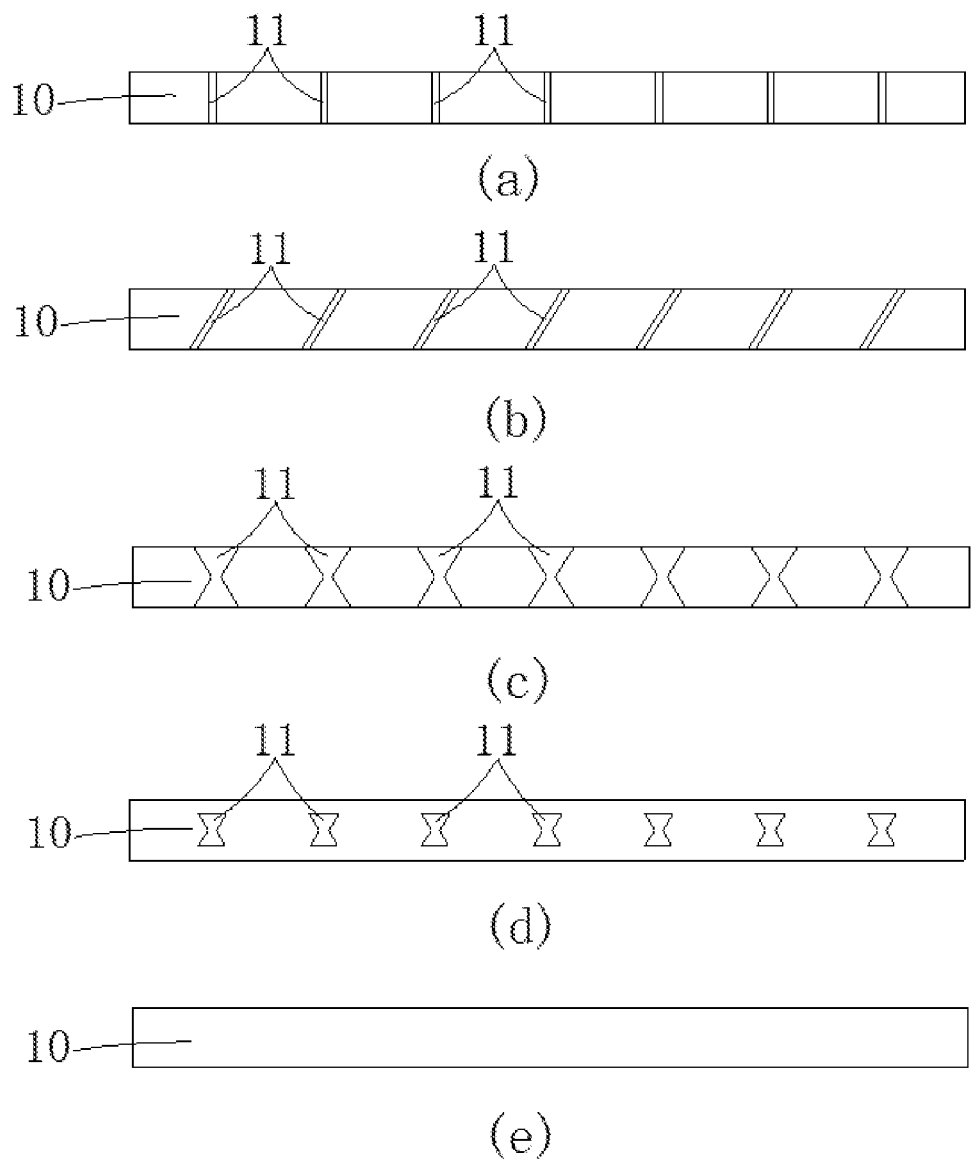
FIGS. 2(a)-2(e) depict schematic structural views of a substrate applied in the pressure sensing structure in FIG. 1.

Furthermore, as shown in FIG. 2 (a), the strain concentration groove 11 is a through groove extending along a direction perpendicular to the first mounting surface 10a; as an alternative, as shown in FIG. 2 (b), the strain concentration groove 11 is a through groove extending in a direction inclined to the first mounting surface 10a; as another alternative, as shown in FIG. 2 (c), the strain concentration groove 11 is a through groove having a longitudinal section in a predetermined shape, the preset shape may be in the shape of funnel-shaped longitudinal section, a circle and the like. As another alternative, as shown in FIG. 2 (d), the strain concentration groove 11 is a blind groove having the longitudinal section in a predetermined shape. The blind groove refers to a groove that does not pass through the substrate 10. The preset shape may be in the shape of in a funnel-shaped longitudinal section, a circle, and the like. The strain sensing element is arranged to be adjacent to the strain concentration groove 11 and is configured to amplify strain signal of the elastic carrier to realize pressure sensing. As yet another alternative, as shown in FIG. 2 (e), the substrate 10 is a whole plate, the deflection of the substrate 10 is transmitted to the first elastic carrier 20 and the second elastic carrier 30, the deflection of the substrate 10 may be detected by the strain sensing element, and the recognizable electrical signal is output by the signal measuring circuit 40.

The pressure sensing structure 100 may be suitable for different sensitivity requirements under different occasions by changing the thickness of the substrate 10 and the shape of the strain concentration groove 11.

Figure 3:
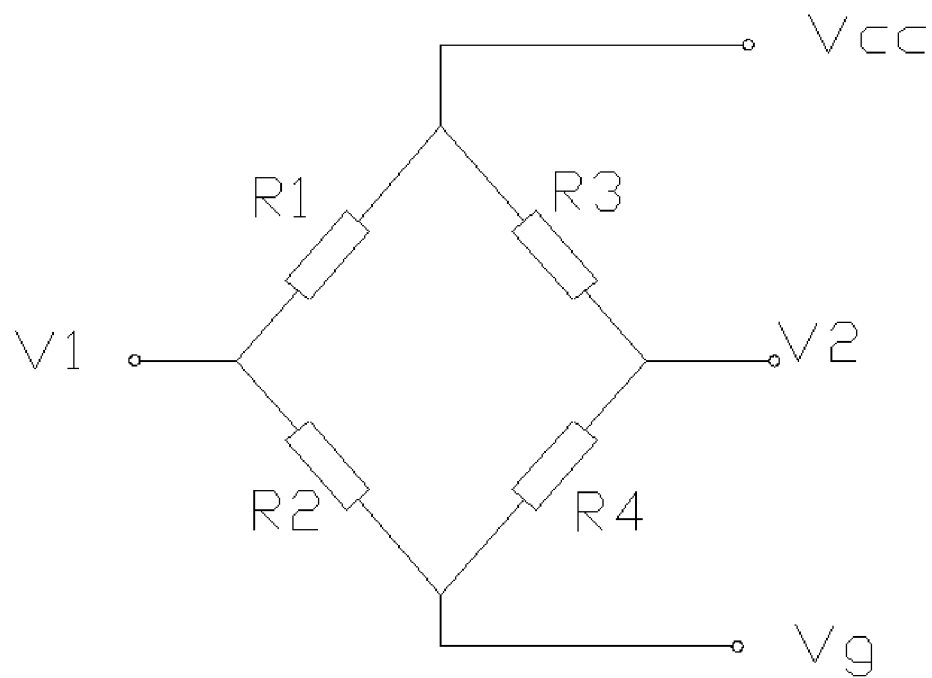
FIG. 3 depicts a schematic diagram of a signal measuring circuit applied in the pressure sensing structure in FIG. 1.
Figure 4:
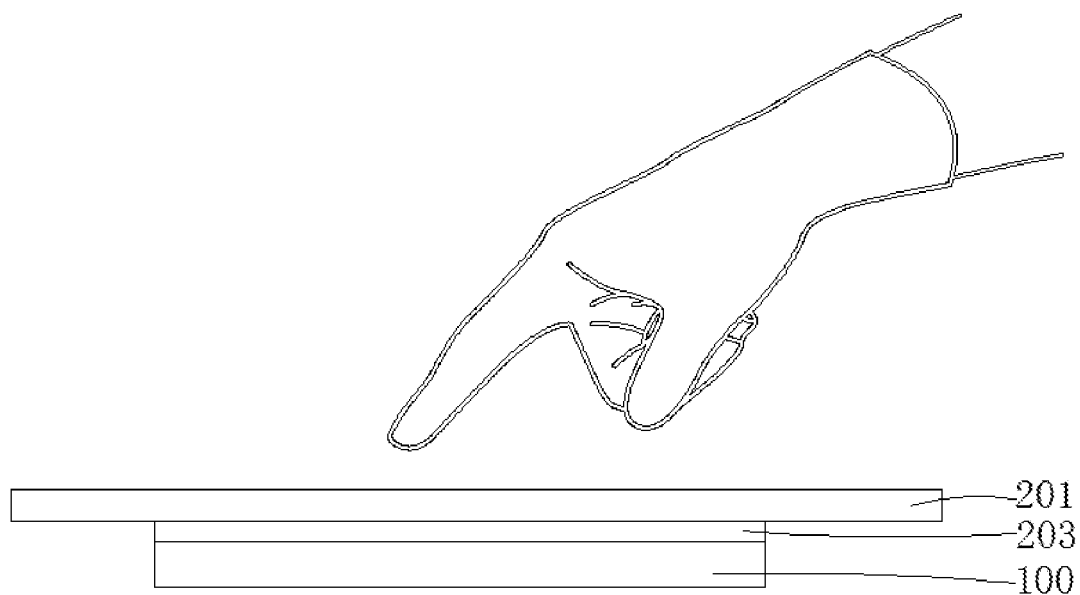
FIG. 4 depicts a schematic structural diagram of applying the pressure sensing structure on a panel without pressing the panel.
Figure 5:
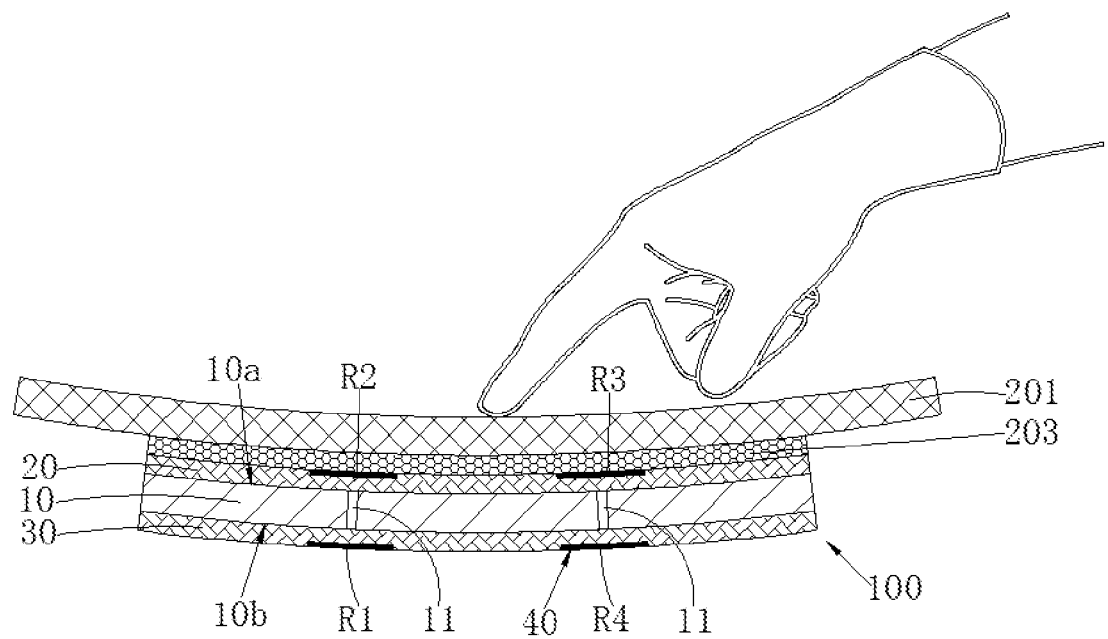
FIG. 5 depicts a schematic structural diagram of applying the pressure sensing structure on the panel in FIG. 4 and when the panel is pressed.

Furthermore, referring to FIGS. 3-5, one signal measuring circuit 40 is provided with four electronic components, where the signal measuring circuit 40 is a full bridge formed by electrically connecting four strain sensing elements R1, R2, R3 and R4.

The conditions of attaching the pressure sensing structure 100 to the inner side of the panel, attaching the pressure sensing structure 100 to the inner side of the side frame or attaching the pressure sensing structure 100 to the inner side of other thin-wall part are similar. Taking the pressure sensing structure 100 is attached to the panel 201 through a colloid 203 and the signal measuring circuit 40 is the full bridge formed by electrically connecting four strain sensing elements R1, R2, R3 and R4 as an example, it indicates that, the pressure sensing structure 100 has lower dependence on the colloid 203 as compared to other existing sensor structures, such that an error caused by adhesion difference of the colloid 203 may be eliminated, and hence the measurement is accurate and reliable.

In this embodiment, the strain sensing element is a strain gauge pressure sensor, for the convenience of explanation of this embodiment, the strain sensing element may be represented by $R_1$, $R_2$, $R_3$ and $R_4$. Where, all the strain sensing elements are close to the strain concentration grooves 11 corresponding to the substrate 10. The strain sensing elements $R_1$ and $R_4$ are mutually opposite bridge arms and are located on the lower side of the substrate 10; the strain sensing elements $R_2$ and $R_3$ are mutually opposite bridge arms and are located on the upper side of the substrate 10; the strain sensing elements $R_1$, $R_2$, $R_3$ and $R_4$ form a full bridge as shown in FIG. 3. When a voltage V is applied on both ends of $V_{CC}$ and $V_g$, a voltage difference $V_{sign}$ is output from two ends of $V_1$ and $V_2$. For the convenience of explanation of the working principle of this embodiment, assuming that $R_1=R_2=R_3=R_4=R$, the voltage difference $V_{sign}$ at the two ends of $V_1$ and $V_2$ is formulized as: $V_{sign}=V_2-V_1=0$.

When the panel 201 is pressed, the panel 201 will generate downward deflection, the pressure sensing structure 100 will be deformed through the colloid 203 with the deflection of the panel 201, which causes the strain sensing elements $R_1$, $R_2$, $R_3$ and $R_4$ to be deformed, and further causes resistances of $R_1$, $R_2$, $R_3$ and $R_4$ to be changed. Due to the fact that the panel 201 is bent and deformed downwards, the lower surface of the panel 201 generates tensile deformation. Regarding the selected colloid 203, the horizontal dimension of the colloid 203 is greater than the longitudinal dimension of the colloid 203, the ratio of the width to the thickness is at least above 50:1, longitudinal deformation amount of the colloid 203 is far smaller than transverse deformation amount of the colloid 203.

When a rubber 203 with smaller elastic modulus is selected, the elastic modulus is less than or equal to 50 MPa, the transverse deformation amount of the colloid 203 is greater, that is, the colloid 203 is prone to be deformed transversely, such that extremely few transverse tensile strain of the panel 201 is transferred to the pressure sensing structure 100, most of the transverse tensile strain is absorbed by the colloid 203; in another aspect, regarding the longitudinal strain of the colloid 203, the longitudinal deformation amount of the colloid 203 is very small due to the fact that the longitudinal dimension of the colloid 203 is very small, that is, it is difficult to generate longitudinal deformation, the pressure sensing structure 100 is tightly attached to the panel 201, so that the deformation curvature radius of the pressure sensing structure 100 may be regarded as approximately the same as the deformation curvature radius of the panel 201, the horizontal tensile deformation of the pressure sensing structure 100 is too small and may be ignored, thus, the pressure sensing structure 100 is not subjected to a pure bending of transverse tensile deformation, which is similar to a bending strain of a beam. Regarding the bending strain similar to that of a beam, the strain sensing elements $R_1$ and $R_4$ located on the lower side of the substrate 10 generate tensile strain, the strain sensing elements $R_2$ and $R_3$ located on the upper side of the substrate 10 generate compressive strain. In this embodiment, the resistances of the strain sensing elements $R_1$ and $R_2$, $R_3$ and $R_4$ will increase with the tensile strain and decrease with the compression strain, that is, the resistances of the strain sensing elements $R_1$ and $R_4$ are increased, and the strain sensing elements $R_2$ and $R_3$ are reduced. Due to the fact that a symmetric structure about the vertical direction is applied in the pressure sensing structure 100, considering that the deflection is a pure deflection, the changes of the strain sensing elements $R_1$, $R_4$ and the changes of the strain sensing elements $R_2$ and $R_3$ is equal in value and opposite in direction. For the convenience of explanation of this embodiment, assuming that the resistance change value is $\Delta R$ ($\Delta R>0$), and the resistance values of $R_1$, $R_2$, $R_3$ and $R_4$ after deformation are respectively as follows:

$$R_1=R_4=R+\Delta R;\ R_2=R_3=R-\Delta R$$

Where, $\Delta R$ is the change value caused by deflection of the strain sensing element.

Meanwhile, the voltage difference at the two ends of the bridge circuit is formulized as:

$$V_{sign}=V_2-V_1=R_1*V(R_1+R_2)-R_3*V(R_3+R_4)=(\Delta R/R)*V$$

In this embodiment, the change value of the $\Delta R$ has a correspondence relationship with the strain, and the strain is related with the magnitude and the position of applied pressure, thus, the magnitude and the position of the pressing force from the user may be recognized by detecting the change of the $V_{sign}$, and a pressure touch control function is realized.

When the rubber 203 with relatively larger elastic modulus is selected, the elastic modulus is greater than 50 MPa, the transverse strain of the colloid 203 is very small, and the tensile deformation of the pressure sensing structure 100 is not negligible, the pressure sensing structure 100 is subjected to its own deflection and the tensile deformation of the panel 201, the pressure sensing structure 100 is the superposition of two kinds of strain deformations. Due to the fact that the tensile deformation is transverse deformation, the strain of the first elastic carrier 20 is identical to the strain of the second elastic carrier 30, the resistance changes of the strain sensing elements $R_1$, $R_2$, $R_3$ and $R_4$ caused by the tensile deformation are identical; for the convenience of explanation of this embodiment, the change of the resistance value caused by tensile deformation is assumed to be $\Delta R'(\Delta R'>0)$, the resistance values of $R_1$, $R_2$, $R_3$ and $R_4$ caused by tension and deflection are respectively formulized as:

$$R_1=R_4=R+\Delta R+\Delta R';\ R_2=R_3=R-\Delta R+\Delta R'$$

In this case, the voltage difference is formulized as:

$$V_{sign}'=V_2-V_1=R_1*V(R_1+R_2)-R_3*V(R_3+R_4)=(\Delta R/(R+\Delta R'))*V$$

In this embodiment, micro-deformation is detected, the resistance change $\Delta R' \ll R$, the aforesaid formula may be simplified as:

$$V_{sign}' \approx (\Delta R/R)*V = R_1 = V_{sign}$$

That is, no matter the colloid 203 with larger elastic modulus or smaller elastic modulus is selected, the acquired output signals are very close to each other. The pressure sensing structure 100 described above has a lower dependence on the colloid 203 as compared to other existing sensor structures, thus, the error caused by adhesion difference of the colloid 203 may be eliminated, and the measurement is accurate and reliable.

It should be understood that, other technical solutions may also be adopted in the signal measuring circuit 40. One signal measuring circuit 40 has four electronic components, the signal measuring circuit 40 is a wheatstone bridge in which bridge one strain sensing element and three reference resistances are electrically connected; as an alternative, one signal measuring circuit 40 has four electronic components, and the signal measuring circuit 40 is a half bridge formed by electrically connecting two strain sensing parts with two reference resistances; as another alternative, one signal measuring circuit 40 has four electronic components, and the signal measuring circuit 40 is a bridge circuit formed by electrically connecting three strain sensing elements with one reference resistance.

Furthermore, the strain sensing element is a strain gauge pressure sensor, an inductive pressure sensor, a capacitive pressure sensor or a polymer strain sensor or some other strain sensing element. In practical application, the strain sensing element is selected as needed.

Furthermore, the electronic component on the first elastic carrier 20 is located on one side of the first elastic carrier 20 facing the substrate 10, as an alternative, the electronic component on the first elastic carrier 20 is located on one side of the first elastic carrier 20 away from the substrate 10. At least one of the two solutions is selected. The electronic component on the second elastic carrier 30 is located on one side of the second elastic carrier 30 facing the substrate 10, as an alternative, the electronic component on the second elastic carrier 30 is located on one side of the second elastic carrier 30 away from the substrate 10. These electronic components may be distributed on one side or two sides of the corresponding elastic carrier, these electronic components may be distributed on either of the front side and the rear side of the corresponding elastic carrier to form the corresponding signal measuring circuit 40.

Furthermore, there are at least two signal measuring circuits 40, the signal measuring circuit 40 is arranged on the substrate 10 in array. According to the technical solution, pressure sensing can be performed on a plurality of positions; moreover, gesture recognition and sliding functions, which cannot be realized by mechanical buttons, may be realized through an algorithm.

Furthermore, two electronic components in the signal measuring circuit 40 are overlapped correspondingly; as an alternative, the two electronic components in the signal measuring circuit 40 are distributed in a staggered mode. The electronic components may be partially or entirely distributed near the strain concentration groove 11 according to the requirement.

Figure 8:
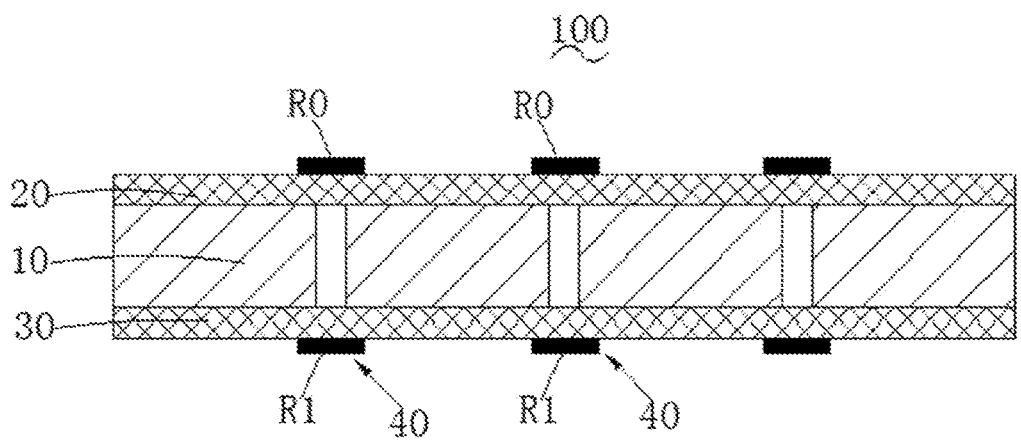
FIG. 8 depicts a schematic structural diagram of a pressure sensing structure provided by embodiment two of the present disclosure.
Figure 9:
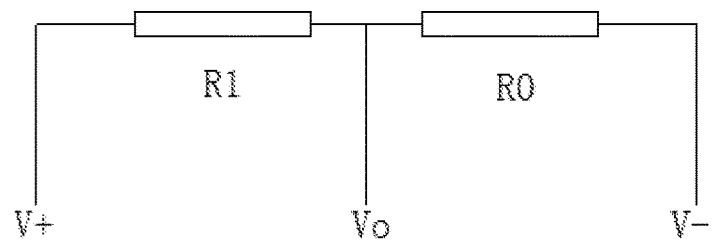
FIG. 9 depicts a schematic diagram of a signal measuring circuit applied in the pressure sensing structure in FIG. 8.

Referring to FIGS. 8 and 9, the pressure sensing structure 100 provided by embodiment two of the present disclosure is substantially the same as the pressure sensing structure 100 provided in embodiment one, what is different from the embodiment one is that, one signal measuring circuit 40 has two electronic components, the signal measuring circuit 40 is a voltage division circuit formed by one strain sensing element $R_1$ and one reference resistance $R_0$ connected in series.

A constant voltage source is adopted, an input voltage $U_i$ is applied on two ends of V+ and V−, and a potential at $V_o$ is detected, or an output voltage $U_o$ between Vo and the ground is measured, an input and output voltage formula is formulized as:

$$U_o = \frac{R_1}{R_1 + R_0} U_i$$

When the strain sensing element $R_1$ is deformed, the electrical property of the strain sensing element $R_1$ is changed, the output voltage $U_o$ is obtained by the signal measuring circuit 40, the corresponding electrical signal output is obtained, and the pressure identification and detection is realized.

It should be understood that, one signal measuring circuit 40 has two electronic components, the signal measuring circuit 40 is the voltage division circuit formed by two strain sensing elements connected in series. According to this technical solution, corresponding electrical signal output may also be obtained to realize the pressure identification and detection.

Figure 10:
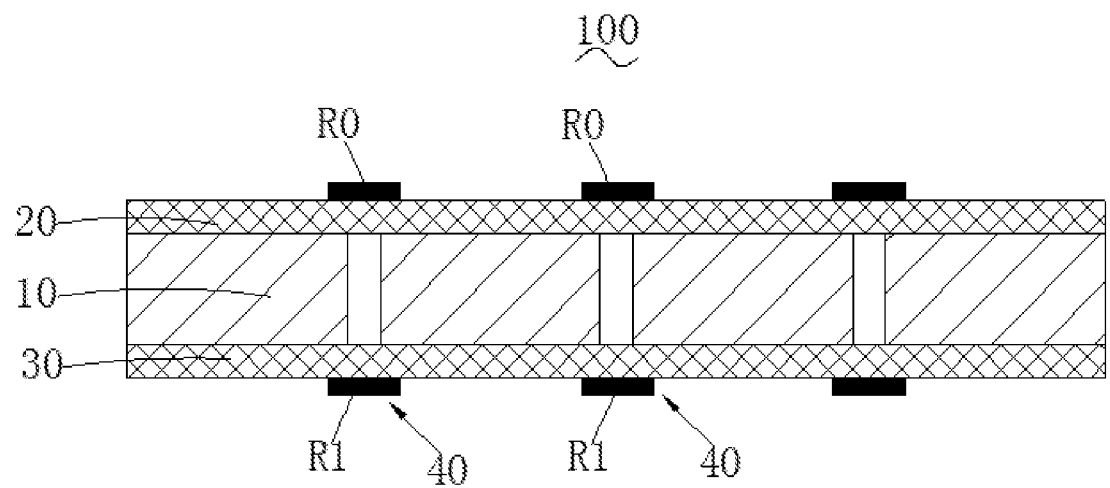
FIG. 10 depicts a structural schematic diagram of a pressure sensing structure provided by embodiment three of the present disclosure.
Figure 11:
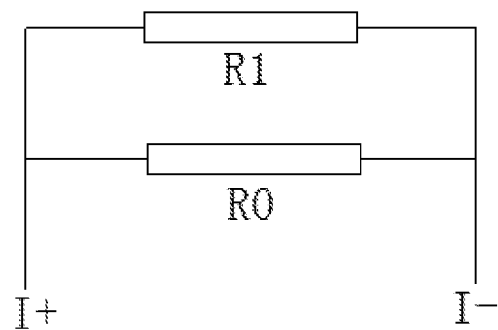
FIG. 11 depicts a schematic diagram of a signal measuring circuit applied in the pressure sensing structure shown in FIG. 10.

Referring to FIGS. 10 and 11, the pressure sensing structure 100 provided by embodiment three of the present disclosure is substantially the same as the pressure sensing structure 100 provided by embodiment one, what is different from the first embodiment is that, one signal measuring circuit 40 has two electronic components, the signal measuring circuit 40 is a shunt circuit formed by one strain sensing element $R_1$ and one reference resistance $R_0$ connected in parallel.

A constant current source is adopted, an input current I is applied to two ends of i+ and i−, output current $I_1$ on a subcircuit $R_1$ is measured, an input and output current formula is formulized as:

$$I_1 = \frac{R_0}{R_1 + R_0} I$$

When the strain sensing element $R_1$ is deformed, the electrical property of the strain sensing element $R_1$ is changed, the output current $I_1$ is obtained by the signal measuring circuit 40, the corresponding electrical signal output is obtained, and the pressure identification and detection is realized.

It can be understood that, one signal measuring circuit 40 has two electronic components, the signal measuring circuit 40 is a shunt circuit formed by two strain sensing elements connected in parallel. According to this technical solution, corresponding electrical signal output may also be obtained to realize the pressure identification and detection through a pressure sensing detection circuit. Alternatively, other existing signal measuring circuits may also be used in the signal measuring circuit 40.

Referring to FIGS. 4 and 5, the electronic product provided by embodiment one of the present disclosure includes a panel 201 and the pressure sensing structure 100 mentioned above, and the pressure sensing structure 100 is attached to the inner side of the panel 201.

The pressure sensing structure 100 is attached to the inner side of the panel 201 of the electronic product, when the panel 201 is pressed, the panel 201 may generate deflection, which causes the substrate 10 to generate deflection; the deflection is detected by the strain sensing element, and recognizable electric signal is output by the signal measuring circuit 40. The detection of applied pressure and pressed position may be realized by detecting the strain of the panel 201. The electronic product may avoid the conditions of being discontinuous in appearance, being difficult in waterproof and dustproof, being short in service life and being difficult in assembly due to the traditional mechanical buttons from occurring.

The panel 201 may be a touch screen with a rigid structure, a display or some other electronic equipment. A magnitude of touch control pressure and a touch control position may be accurately recognized simultaneously by connecting the pressure sensing structure 100 with the panel 201, an application scope is expanded for the electronic equipment in product application, human-computer interaction and consumption experience. A user may obtain an accurate pressure level and a pressure magnitude directly by touching the touch screen, the display or the electronic equipment. The accurate pressure value of pressing may be obtained after a correction is performed.

Further, the pressure sensing structure 100 is connected with the panel 201 through a colloid 203, or by welding or through some other mechanical connections. When the colloid 203 is used, the pressure sensing structure 100 is used as long as the colloid 203 is adhered, it is convenient to use the pressure sensing structure 100, an assembling process is simplified, and reworking is facilitated. When a user finger is pressed on the panel 201, the panel 201 will become bent and deformed, the colloid 203 causes the pressure sensing structure 100 to be deformed, the pressed position and the pressure magnitude are obtained, and thus a pressure touch control function is realized. The colloid 203 is a water gel or a double faced adhesive tape.

Figure 12:
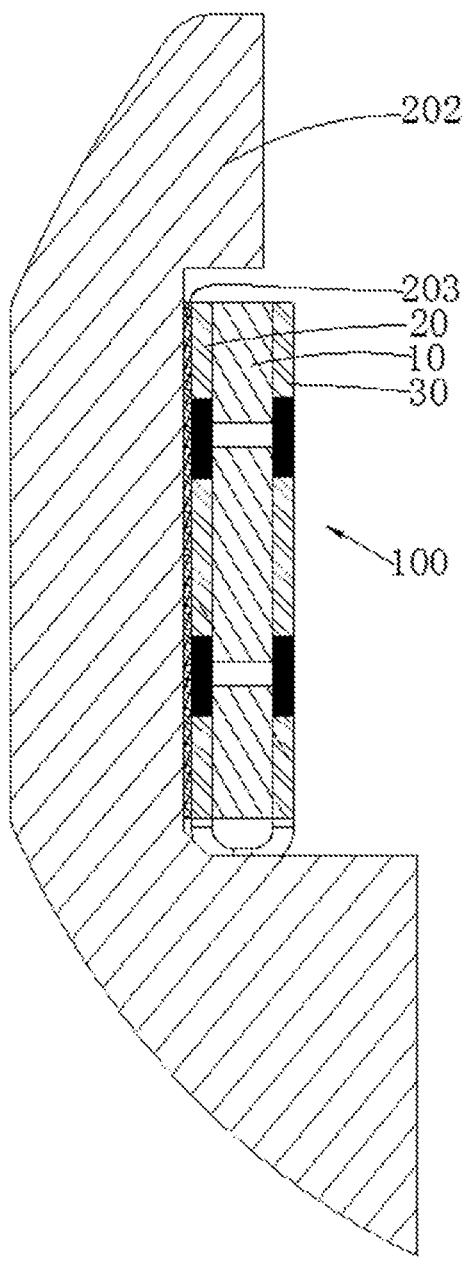
FIG. 12 depicts a schematic structural diagram of applying the pressure sensing structure shown in FIG. 1 in a side frame.

Referring to FIG. 12, the electronic product provided by embodiment two of the present disclosure includes a side frame 202 and the pressure sensing structure 100 mentioned above, and the pressure sensing structure 100 is attached to an inner side of the side frame 202.

The pressure sensing structure 100 is attached to side frame 202 of the electronic product, and particularly to the side frame 202 of the intelligent mobile phone, when the side frame 202 is pressed, the substrate 10 may be bent and deformed with the pressing of the side frame 202, the deflection is detected by the strain sensing element, and recognizable electric signal is output by the signal measuring circuit 40, both the pressed position and the pressing magnitude are recognized, and a side frame touch button function is realized, there is no need to concavely arrange a groove on the side frame 202 of the electronic product independently, the appearance is simple and elegant. The electronic product may avoid the conditions of being discontinuous in appearance, being difficult in waterproof and dustproof, being short in service life and being difficult in assembly due to the traditional mechanical buttons from occurring.

Furthermore, the pressure sensing structure 100 is connected with the panel 201 through a colloid 203, or by welding or through some other mechanical connections. When the colloid 203 is used, the pressure sensing structure 100 is used as long as the colloid 203 is adhered, it is convenient to use the pressure sensing structure 100, an assembling process is simplified, and reworking is facilitated. The colloid 203 is a water gel or a double faced adhesive tape.

It should be understood that, the pressure sensing structure 100 may also be attached to inner sides of some other thin-walled parts, when a thin-walled part is pressed, the thin-walled part may generate deflection which causes the substrate to generate deflection, the deflection is detected by the strain sensing element and the recognizable electric signal is output by the signal measuring circuit. The detection of the applied pressure and the pressed position may be realized by detecting the strain of the thin-walled part.

Further, the pressure sensing structure is connected with the thin-walled part through the colloid, or by welding or through some other mechanical connections. When the colloid is used, the pressure sensing structure is used as long as the colloid is adhered, it is convenient to use the pressure sensing structure 100, an assembling process is simplified, and reworking is facilitated. The colloid is a water gel or a double faced adhesive tape.

The forgoing are only preferred embodiments of the present disclosure, and should not be regarded as the limitation to the present disclosure. Any modification, equivalent replacement, improvement, and the like, which are made within the spirit and the principle of the present disclosure, should all be included in the protection scope of the present disclosure.

What is claimed is:

1. A pressure sensing structure configured to be adhered to a panel or a side frame with an adhesive having an elastic modulus, the pressure sensing structure comprising:
   a substrate having a first mounting surface and a second mounting surface which are opposite to each other;
   a first elastic carrier arranged on the first mounting surface;
   a second elastic carrier arranged on the second mounting surface; and
   a signal measuring circuit including a strain sensing element comprising at least a first electronic component disposed on the first elastic carrier and at least a second electronic component disposed on the second elastic carrier and electrically connected to the first electronic component in a bridge circuit distributed between the first and second elastic carriers, wherein the bridge circuit is arranged to detect deflection amount of the substrate by detecting a strain variation between the first elastic carrier and the second elastic carrier while reducing or eliminating dependence on the elastic modulus of the adhesive.

2. The pressure sensing structure according to claim 1, wherein the first and second electronic components in the signal measuring circuit are distributed adjacently.

3. The pressure sensing structure according to claim 1, wherein the first electronic component on the first elastic carrier is located on one side of the first elastic carrier facing the substrate or located on one side of the first elastic carrier facing away from the substrate; the second electronic component on the second elastic carrier is located on one side of the second elastic carrier facing the substrate or located on one side of the second elastic carrier facing away from the substrate.

4. The pressure sensing structure according to claim 1, wherein a strain concentration groove is concavely arranged on the substrate, and the first and second electronic components are arranged adjacent to the strain concentration groove.

5. The pressure sensing structure according to claim 4, wherein the strain concentration groove comprises a through groove extending along a direction perpendicular to the first mounting surface, a through groove extending in a direction inclined to the first mounting surface, a through groove having a longitudinal section in a predetermined shape, or a blind groove having a longitudinal section in a predetermined shape.

6. The pressure sensing structure according to claim 1, further comprising another signal measuring circuit, wherein the signal measuring circuit and the another signal measuring circuit are distributed on the substrate in an array, the another signal measuring circuit has at least two electronic components disposed on the first elastic carrier and the second elastic carrier respectively, and at least one of the two electronic components comprises a strain sensing element configured to detect deflection amount of the substrate.

7. The pressure sensing structure according to claim 1, wherein
the second electronic component comprises a reference resistance, and the signal measuring circuit comprises a voltage division circuit formed by the first and second electronic components connected in series or a shunt circuit formed by the first and second electronic components connected in parallel.

8. The pressure sensing structure according to claim 1, wherein
the second electronic component comprises a reference resistance, the signal measuring circuit further comprises two other reference resistances, and the bridge circuit is a wheatstone bridge formed by electrically connecting the first and second electronic components and the two reference resistances.

9. The pressure sensing structure according to claim 1, wherein the first and second electronic components of the signal measuring circuit are overlapped with each other; or the first and second electronic components of the signal measuring circuit are distributed in a staggered arrangement.

10. An electronic product, comprising the panel and a pressure sensing structure according to claim 1, wherein the pressure sensing structure is attached to an inner side of the panel.

11. The electronic product according to claim 10, wherein the adhesive connecting the pressure sensing structure with the panel comprises a colloid or a weld.

12. An electronic product, comprising the side frame and a pressure sensing structure according to claim 1, wherein the pressure sensing structure is attached to an inner side of the side frame.

13. The electronic product according to claim 12, wherein the adhesive connecting the pressure sensing structure with the side frame comprises a colloid or a weld.

14. The pressure sensing structure according to claim 1, wherein the second electronic component comprises a strain sensing element, and the bridge circuit includes a voltage division circuit formed by the first and second electronic components connected in series or a shunt circuit formed by the first and second electronic components connected in parallel.

15. The pressure sensing structure according to claim 1, wherein the second electronic component comprises a strain sensing component, said bridge circuit further comprises two reference resistances, a half bridge of the bridge circuit being formed by electrically connecting the first and second electronic components with the two reference resistances.

16. The pressure sensing structure according to claim 1, wherein the second electronic component comprises a strain sensing component, said signal measuring circuit further comprises plural strain sensing elements, the bridge circuit comprising a full bridge formed by electrically connecting the first and second electronic components and said plural strain sensing elements.

17. The pressure sensing structure according to claim 1, wherein the second electronic component comprises a strain sensing element, said signal measuring circuit further comprises another strain sensing element and a reference resistance, and the bridge circuit is formed by electrically connecting the first and second electronic components, the another strain sensing element and the reference resistance.

18. The pressure sensing structure of claim 1 wherein the adhesive comprises a gel or double faced adhesive tape or a weld.

19. The pressure sensing structure of claim 1 wherein the elastic modulus of the adhesive is less than or equal to 50 MPa.

20. The pressure sensing structure of claim 1 wherein the elastic modulus of the adhesive is larger than 50 MPa.

* * * * *